(12) United States Patent
Teodosiu et al.

(10) Patent No.: US 7,716,187 B2
(45) Date of Patent: May 11, 2010

(54) SYSTEM AND METHOD FOR TRANSPARENT STORAGE REORGANIZATION

(75) Inventors: Dan Teodosiu, Bellevue, WA (US); Brian K. Dewey, Seattle, WA (US); Andrew M. Herron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 10/772,533

(22) Filed: Feb. 5, 2004

(65) Prior Publication Data

US 2004/0243646 A1 Dec. 2, 2004

Related U.S. Application Data

(60) Provisional application No. 60/472,500, filed on May 21, 2003.

(51) Int. Cl.
*G07F 17/30* (2006.01)
(52) U.S. Cl. ...................................................... 707/667
(58) Field of Classification Search .............. 707/200, 707/204, 205
See application file for complete search history.

(56) References Cited

U.S. PATENT DOCUMENTS

| | | | | |
|---|---|---|---|---|
| 4,408,273 A * | 10/1983 | Plow | ........................... | 707/202 |
| 4,888,681 A * | 12/1989 | Barnes et al. | ............... | 707/101 |
| 5,237,682 A * | 8/1993 | Bendert et al. | .............. | 707/205 |
| 5,566,328 A * | 10/1996 | Eastep | ......................... | 707/102 |
| 6,189,000 B1 * | 2/2001 | Gwertzman et al. | ............ | 707/1 |
| 6,289,334 B1 * | 9/2001 | Reiner et al. | ................... | 707/3 |
| 6,385,701 B1 * | 5/2002 | Krein et al. | .................. | 711/141 |
| 6,460,055 B1 * | 10/2002 | Midgley et al. | ............. | 707/204 |
| 6,598,038 B1 * | 7/2003 | Guay et al. | ..................... | 707/2 |
| 6,654,830 B1 * | 11/2003 | Taylor et al. | ................... | 710/74 |
| 6,985,901 B1 * | 1/2006 | Sachse et al. | ................. | 707/10 |
| 7,065,541 B2 * | 6/2006 | Gupta et al. | ................. | 707/204 |
| 7,065,618 B1 * | 6/2006 | Ghemawat et al. | .......... | 711/161 |
| 7,107,285 B2 * | 9/2006 | von Kaenel et al. | ...... | 707/104.1 |
| 2002/0184144 A1 * | 12/2002 | Byrd et al. | ..................... | 705/40 |
| 2003/0069903 A1 * | 4/2003 | Gupta et al. | ................. | 707/204 |

OTHER PUBLICATIONS

Seejo Sebastine, "A Scalable Content Distribution Service for Dynamic Web Content," Jun. 15, 2001, Department of Computer Science—University of Virginia, 1-34.*

(Continued)

*Primary Examiner*—Neveen Abel Jalil
*Assistant Examiner*—Farhan M Syed
(74) *Attorney, Agent, or Firm*—Workman Nydegger

(57) ABSTRACT

An improved system and method for transparent storage reorganization is provided. A reorganization server may be used to consolidate storage from many servers to fewer servers or to distribute storage from a few servers to many servers. To do so, a legacy server name may be aliased to the network address of a reorganization server. The contents and permissions of each legacy share may then be copied to a unique share name on another server. A root may next be created on the reorganization server using the legacy server name, and a link that points to the legacy share copied on the other server may be created on that root. Any client may then request access to the relocated legacy share using the legacy share name.

12 Claims, 8 Drawing Sheets

OTHER PUBLICATIONS

"Extensible Security Architectures for Java" by Wallach, Dan S., et al, ACM SIGOPS Operating Systems Review, vol. 31, issue 5, Dec. 1997, pp. 116-128.*

Wallach, Dan, et al., "Extensible Security Architecture for Java," 1997, ACM, pp. 116-128.*

FairCom, "FairCom Update Guide," FiarCom Corp., 2001, pp. 1-27.*

Sebastine, Seejo, "A Scalable Content Distribution Service for Dynamic Web Content," Jun. 15, 2001, Department of Computer Science—University of Virgnia, pp. 1-37.*

* cited by examiner

SYSTEM AND METHOD FOR TRANSPARENT STORAGE REORGANIZATION

CROSS-REFERENCE TO RELATED APPLICATION

The present application claims priority from U.S. provisional application Ser. No. 60/472,500, filed May 21, 2003 and entitled "Transparent Storage Consolidation Using a Modified Distributed File System Server", which is hereby incorporated herein by reference in its entirety.

FIELD OF THE INVENTION

The invention relates generally to computer systems, and more particularly to an improved system and method for transparent storage reorganization.

BACKGROUND OF THE INVENTION

Storage reorganization may be motivated by any number of reasons. For example, storage migration and consolidation are important operations that help reduce the total cost of ownership of storage servers in an enterprise. One important factor in reducing total cost of ownership is to reduce the time and expense required to manage storage servers, and thus the number of servers. Unsurprisingly, storage consolidation often occurs in conjunction with an upgrade to a newer, more performant server version such as moving from Microsoft® Windows NT Server version 4.0 to Microsoft® Windows Server 2003. Storage administrators may take advantage of such an upgrade to reduce management overhead by consolidating storage from many legacy servers onto one or fewer new machines that may serve all the content that was on the legacy servers.

In relocating file shares from two servers, such as "foo" and "bar", one common strategy deployed is to map both the server name "foo" and the server name "bar" to the same storage server. One problem that may occur in this reorganization of storage is a resulting name clash from trying to relocate two file shares with the same name, such as \\foo\public and \\bar\public, onto the same storage server. Normally two shares would need to be created, both with the path name \\server\public. Such a name clash could be avoided by renaming one or both of the relocated shares, using one or more well known techniques such as versioning. However, system administrators may be reluctant to consolidate legacy shares if they must modify the file share names to avoid such a name clash.

Modifying a file share name visible to a user to avoid a name clash raises several problems. First of all, modifying a file share name visible to a user during reorganizing storage would require training users to use the new names. Furthermore, file share path names that are embedded in documents, web pages, and applications would need to be located and the old names would need to be changed to the new names. These burdensome activities would require additional time and expense for a storage administrator managing reorganization of storage.

What is needed is a way for a storage administrator to reorganize storage using legacy share names so that users or clients may access the relocated legacy shares using the legacy share names. Any such system and method should allow a system administrator to easily and efficiently monitor client access to the relocated legacy shares so that the storage administrator may retire relocated legacy shares that are infrequently used.

SUMMARY OF THE INVENTION

Briefly, the present invention provides an improved system and method for transparently reorganizing storage. To this end, a reorganization server is provided that may relocate legacy shares from one or more legacy servers onto one or more other servers. The reorganization server may include a distributed file system with a path rewriter for transparently prepending another server name to the received legacy path, and with a path redirector for resolving any links to a new storage location that may be encountered while traversing a rewritten legacy share path. The reorganization server may also include a database or log file for recording access and usage information of relocated legacy shares.

The present invention may transparently reorganize storage by first aliasing the name of a legacy server to the network address of a reorganization server. The contents and permissions of each legacy share may then be copied to a unique share name on another server. A root may next be created on the reorganization server using the legacy server name, and a link that points to the legacy share copied on the other server may be created on that root. Any client may then request access to the relocated legacy share using the legacy share name. The reorganization server may rewrite the received legacy path by prepending it with the reorganization server name, resolve any links in the rewritten legacy share path name, and respond with the share path name of the storage location of the relocated legacy share.

Advantageously, the system and method may be used to re-architect and integrate previously disparate file shares into a single namespace. Moreover, the present invention may be used to expand storage from a few servers to many servers in addition to consolidating storage from many servers to fewer servers. By recording information about access to and usage of the legacy shares on a single reorganization server, a storage administrator may easily monitor access and usage of legacy shares for management and archival purposes. Furthermore, the system and method provided are flexible and extensible so that any file system or name resolution protocol equipped with path rewriting and path redirection capabilities may be used. Thus, the redirection provided by the present invention may be broadly supported across share path names, server names, file system protocols, and other data access protocols.

Other advantages will become apparent from the following detailed description when taken in conjunction with the drawings, in which:

DETAILED DESCRIPTION

Exemplary Operating Environment

Figure 1:
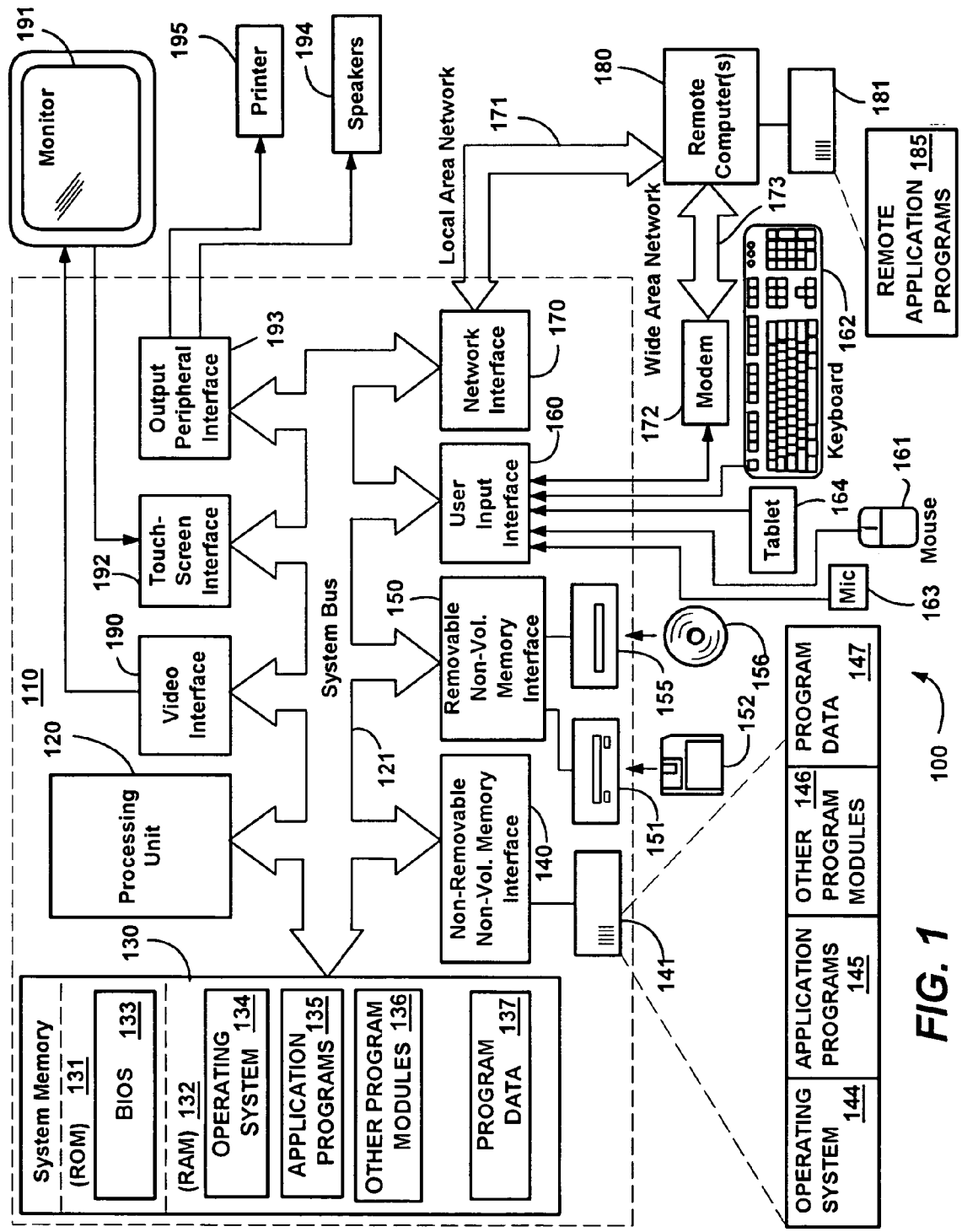
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190 or touch-screen interface 192. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Transparent Storage Reorganization

The present invention is generally directed towards a method and system for providing transparent storage reorganization. As used herein, storage reorganization means any relocation of file shares from one computer to another computer. A share means, as defined herein, a set of files and directories exposed via a remote file system or data access protocol. A legacy share means a previously existing share, such as shares used on servers in various businesses, governments, and other organizations.

One form of storage reorganization is storage consolidation. Storage consolidation means herein any relocation of file shares to one or more other storage systems, including storage servers, that may result in a reduction of the set of storage systems. As will be understood, the various block diagrams, flow charts and scenarios described herein are only examples, and there are many other scenarios to which the present invention will apply.

Storage may be reorganized in many ways using different system configurations. As an example, the system of FIG. 2 will be described using one embodiment of a system for reorganizing storage, a consolidation server. A consolidation server may reorganize storage by consolidating storage from one or more legacy servers. As will be understood, the system for consolidating storage from one or more legacy servers is one example of many system configurations that may use the system components described for reorganizing storage.

Figure 2:
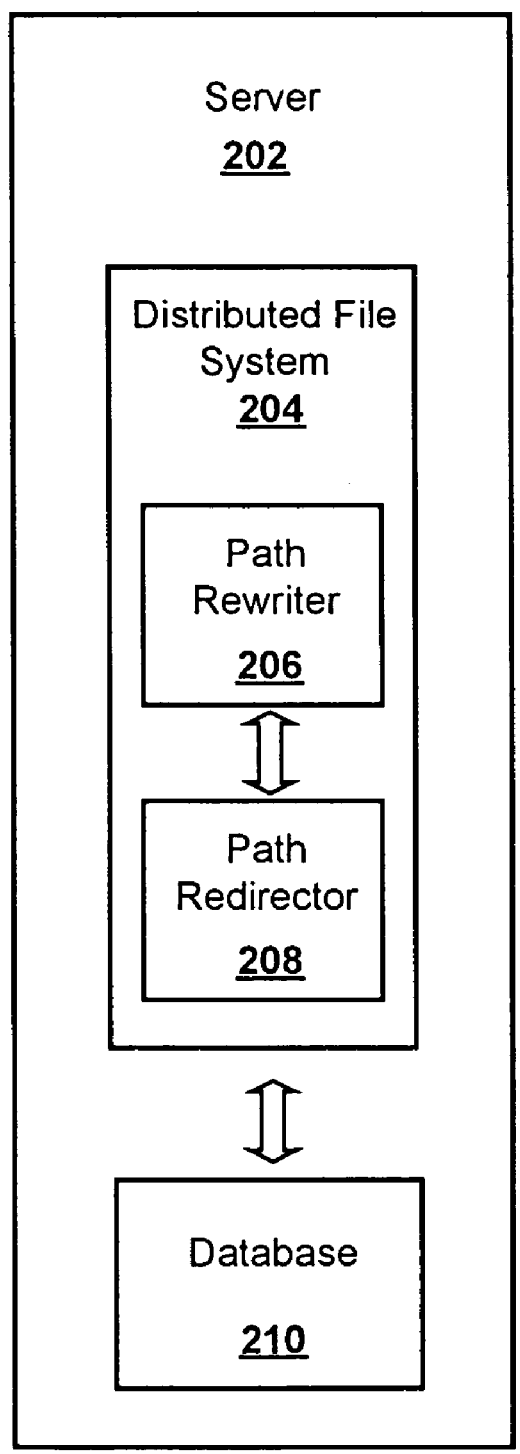
FIG. 2 is a block diagram generally representing an exemplary architecture of system components for reorganizing storage, in accordance with an aspect of the present invention.

Turning to FIG. 2 of the drawings, there is shown a block diagram generally representing an exemplary architecture of system components for reorganizing storage. Those skilled in the art will appreciate that the functionality implemented within the blocks illustrated in the diagram may be implemented as separate components or the functionality of several or all of the blocks may be implemented within a single component. For example, the functionality for the database 210 may be included in the distributed file system 204. Or the functionality of the path rewriter 206 may be may be implemented as a separate component.

The server 202 may include a distributed file system 204 and a database 210. In general, the distributed file system 204 and the database 210 may be any type of executable software code such as a kernel component, an application program, a linked library, an object, and so forth. The distributed file system 204 may include an operably coupled path rewriter 206 and an operably coupled path redirector 208. Each of these components may also be any type of executable software code such as a kernel component, an application program, a linked library, an object, or other type of executable software code.

In specific, the distributed file system 204 may be any file system with path rewriting and path redirection implemented as shown in FIG. 2 by the path rewriter 206 and the path redirector 208, respectively. Such a file system may receive requests for accessing a file share using any type of file system protocol, including the Microsoft® Distributed File System (Dfs) using the Server Message Block (SMB) protocol for accessing file shares or using other types of file system protocols that provide similar characteristics, such as the NetBIOS protocol, the Network File System protocol (NFS), the Netware File Sharing Protocol (NFSP), or another protocol. In one embodiment, a Dfs service augmented with path rewriting and path redirection may be run on the server 202. This Dfs service may be enabled, for instance, through an operating system configuration setting such as a registry key in the registry of the operating system of the server 202.

The distributed file system 204 may receive a request to access a file. The path rewriter 206 may automatically rewrite any path for a legacy share to prepend another server name to the legacy server name. For example, in an embodiment such as the consolidation server, the path rewriter 206 may rewrite the legacy share path to prepend the consolidation server name to the legacy share path. After rewriting the path name, the distributed file system 204 on the consolidation server may continue normal processing on the rewritten path name. As part of its normal processing, the distributed file system 204 may access the Dfs root corresponding to the legacy server name, traverse the legacy share path name, and encounter a link pointing to a storage location of a relocated legacy share. In this case, the distributed file system 204 may invoke the path redirector 208.

The path redirector 208 may resolve any links encountered while traversing a legacy share path, including a rewritten legacy share path. Such a link may point to any kind of path that may be supported by file system protocols, such as Dfs, SMB, NetBIOS, NFS, NFSP or other type of protocol. Upon resolving the link, the distributed file system may respond with the share path of the storage location of the relocated legacy share.

In one embodiment of the consolidation server, the consolidated storage may be organized in a separate Dfs namespace. In this case, the link may contain the path in the namespace that corresponds to the consolidated legacy share. Advantageously the path redirector 208 of the consolidated server may, in turn, redirect that path to the new namespace and later the storage may be moved or reorganized within the new Dfs namespace without impacting the redirection into the new Dfs namespace.

A database 210 is operably coupled to the distributed file system 204 so that access activity and usage of legacy shares may be recorded and monitored. The database may be any type of database or may be a log file. Whenever the server sees a request for a legacy share, the distributed file system 204 may log information about the request into the database or log file. Any information about access to the legacy share may be recorded in the database, such as the name of legacy share that was accessed, which client requested access to the share, etc. This information may be used by a storage administrator in a number of ways. For instance, a storage administrator may track the active usage of the legacy shares. If a storage administrator decides that the shares are infrequently used, then the administrator may retire them. As another example, the storage administrator may use the information to map which user or applications are accessing the legacy paths so that the storage administrator may decide what applications need to be updated with the new path name, or alternatively, to decide which users to notify to update their links to the new path name.

The system described for consolidating storage from one or more legacy servers is one example of many system configurations that may use the system components shown in FIG. 2 for reorganizing storage. Other system configurations for reorganizing storage may include a distribution server that may use the system components described for replacing a monolithic server by dispersing legacy file shares from the monolithic server across one or more smaller servers. Yet another system configuration may include a transfer server that may use the system components described for replacing a legacy server with a replacement server by transferring legacy file shares on the legacy server to the replacement server.

Figure 3:
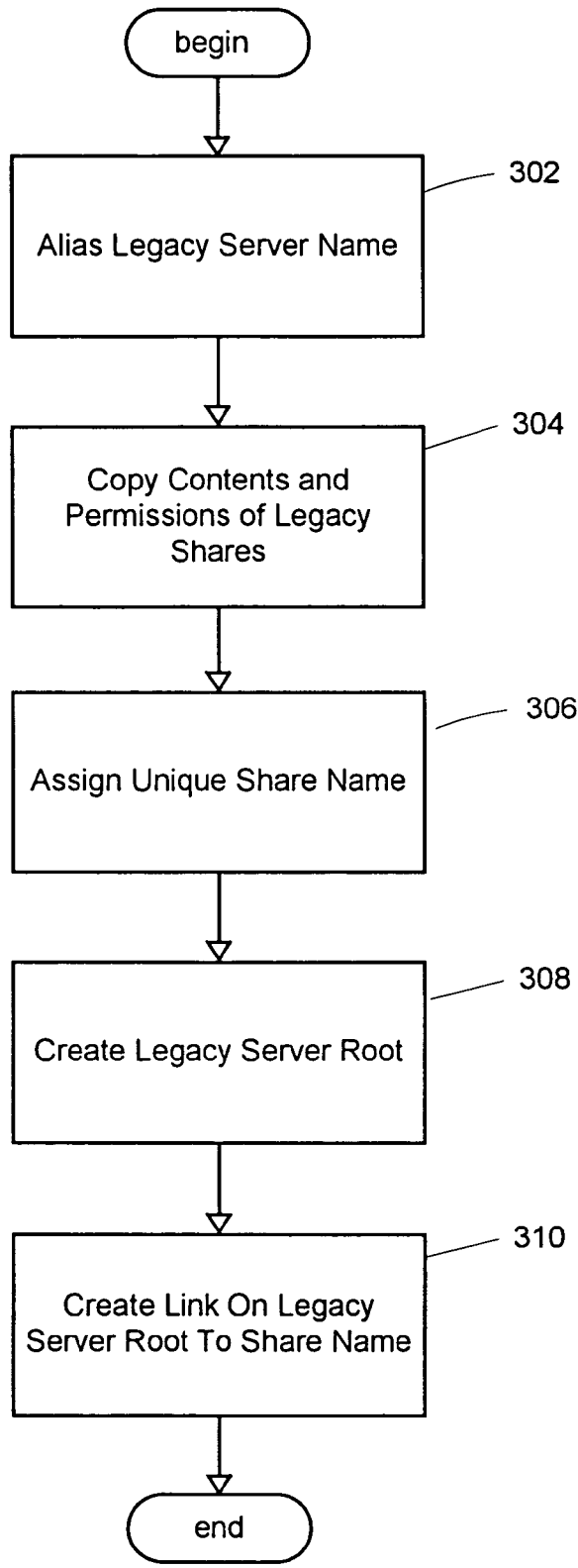
FIG. 3 is a flowchart generally representing the steps undertaken for reorganizing shares from a legacy server onto another server, in accordance with an aspect of the present invention.

FIG. 3 presents a flowchart generally representing the steps undertaken for reorganizing shares from a legacy server onto another server. At step 302, any legacy server name may be aliased to the network address of a reorganization server. The legacy shares may be stored on the reorganization server or on another destination server. Aliasing the legacy server name may result in name lookups on the legacy server names resolving to the reorganization server so that any requests for the legacy server are instead made to the reorganization server for handling the request. This aliasing may be performed for all naming schemes used for the legacy server, such as Domain Name System (DNS) and NetBIOS names, to ensure that any lookups for the legacy server name through any protocol will actually result in the address of the reorganization server where the request will be handled.

After aliasing the legacy server name with the reorganization server name, the contents and permissions of each legacy share may be copied to a destination server at step 304. In one embodiment, the reorganization server may also serve as a destination server for one or more legacy shares. At step 306, each legacy share is assigned a new unique share name. In one embodiment, this unique share name may not be visible to a user or client machine. Using the legacy server name, a legacy server Dfs root may be created on the reorganization machine at step 308. In one embodiment, the legacy server Dfs root may not have the identical name of the legacy server; instead, the legacy server Dfs root name may be a transformation of the legacy server name, such as prepending an identifier string to the legacy server name. At step 310, a Dfs link may be created on the legacy server root to the share name on the destination server where the legacy share was copied. After the link is created on the legacy server root, the copied legacy shares may be accessed from the destination server. Those skilled in the art will appreciate that the steps described in FIG. 3 may be performed in a different order for reorganizing shares from a legacy server onto another server. For example, a legacy server root and a link on the legacy server root may be created on the reorganization machine before the contents and permissions of the legacy files are copied to a destination server.

Figure 4:
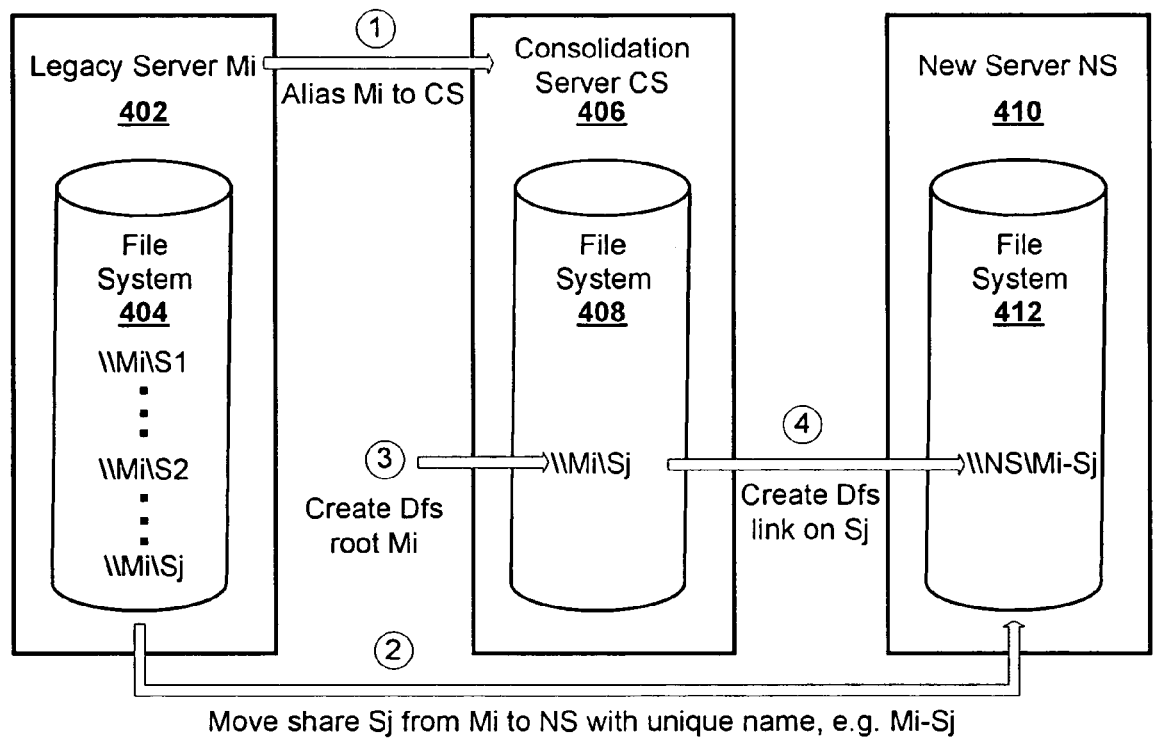
FIG. 4 is an exemplary illustration generally representing a consolidation server consolidating shares from a legacy server onto a new server, in accordance with an aspect of the present invention.

In one embodiment of the present invention, server 202 may be a consolidation server that may consolidate legacy shares from legacy servers onto a smaller set of destination servers. FIG. 4 presents an exemplary illustration generally representing a consolidation server consolidating shares from a legacy server onto a new server. In this embodiment, there may be a number of legacy servers, $M_1$ to $M_i$, such as legacy server $M_i$ 402. Each of these servers may have a file system 404 with one or more shares, $S_1$ to $S_j$, accessed using a path name such as $\backslash\backslash M_i \backslash S_j$. A storage administrator may want to consolidate these shares on a smaller set of new storage servers, such as the new server NS, so that client machines may continue accessing any share by using the same path name.

However, due to popularity of some share names, a share located on one machine may have the same name as a share located on another machine. For example, the name "public" is a common share name. There may be a share name of "public" on machines $M_i$ and $M_k$ that may be accessed using the path names $\backslash\backslash M_i \backslash \text{public}$ and $\backslash\backslash M_k \backslash \text{public}$, respectively. When two shares with the same name are consolidated onto the same server, a name clash may occur unless one or both shares are assigned a unique path name for access. Typically, the path name for accessing one or both shares is changed to avoid the name clash. However, the present invention may allow a storage administrator to consolidate these shares on a smaller set of storage devices so that client machines may continue accessing any share by using the same path name, even in the event of a name clash. To do so, the consolidation server CS 406 may include the distributed file system 204 with path rewriting implemented by the path rewriter 206 and with path redirection implemented by the path redirector 208 as described in FIG. 2.

The first step in FIG. 4 is to alias the legacy server name $M_i$ to the network address of the consolidation server CS 406 to cause the name of the legacy server, in this case $M_i$, to resolve to the network address of the consolidation server CS, so that any requests for the legacy server $M_i$ are instead directed to the consolidation server CS. This aliasing may be performed for all naming schemes used for the legacy server, such as Domain Name System (DNS) and NetBIOS names, to ensure that any lookups for the legacy server name through any protocol will actually result in the address of the consolidation server CS rather than that of the legacy server, $M_i$.

The second step may be performed for every consolidated legacy share. Each legacy share $S_j$ to be consolidated may be copied from the legacy server $M_i$ 402 to the new server NS 410. The contents and permissions of the share $S_j$ may be copied to the new server NS 410 and the share $S_j$ may be given a new unique share name that may not be visible to a user or client machine. Any name may be used for the new share that does not cause a name conflict. In one embodiment, the naming scheme "\\NS\$M_i$-$S_j$" may ensure that no such conflicts occur.

The third step may be performed once per consolidated legacy server $M_i$. Using the legacy server name, a legacy server root, such as a new DFS root with the name $M_i$, may be created on the consolidation server CS 406. As a result, the consolidation server CS may respond, or handle locally, accesses to paths of the form \\CS\$M_i$. With the path rewriter 206 enabled, whenever the distributed file system 204 of the consolidated server CS 406 receives a path name beginning with the server name of $M_i$, such as \\$M_i$, it may rewrite the path as \\CS\$M_i$ followed by the rest of the path. Thus, the distributed file system 204 may find that the rewritten path corresponds to a local Dfs root and then may access that local root according to the Dfs protocol.

Note that, in one embodiment, a character that is illegal for the first character of a root or share name, such as a hash mark, may be prepended to the legacy server name before using it to create a legacy server root on the consolidation server. By so modifying the legacy server name to create a legacy server root, there may be guaranteed that no clash will occur between a local share name on the consolidation server CS and a root name of a legacy server. Assuming no local root or share name may begin with such a character, a name for a local share on the consolidation server CS and a name from a legacy server for a consolidated share may be quickly identified. This may advantageously allow a storage administrator to quickly identify which roots on the consolidation server CS are local roots and which roots are from consolidated shares.

The fourth step may be performed once per legacy share $S_j$ that is consolidated on the new server. A link may be created on the legacy server root \\CS\$M_i$ of the consolidation server CS to the share name \\NS\$M_i$-$S_j$ on the new server NS 410 where the legacy share was copied. Such a link may point to any kind of path that may be supported by the distributed file system protocols, including Dfs, SMB, NetBIOS, NFS, NFSP or other type of protocol. In one embodiment, the link may be a Dfs link that points directly to the location of the consolidated legacy share on the new server NS 410. In this case, a path beginning with \\CS\$M_i$\$S_j$ may be traversed from the root \\CS\$M_i$ until the link $S_j$ is encountered and redirects the request to the new location of the consolidated legacy share \\NS\$M_i$-$S_j$ of the file system 412 on the new server NS 410. In another embodiment of the consolidation server, the consolidated storage may be organized in a separate Dfs namespace. In this case, the link may contain the path in the namespace that corresponds to the consolidated legacy share. Advantageously the path redirector 208 of the consolidated server may, in turn, redirect that path to the new namespace and later the storage may be moved or reorganized within the new Dfs namespace without impacting the redirection into the new Dfs namespace and without requiring any configuration changes on the consolidation server CS.

After the link is created on the legacy server root, the consolidated legacy shares are now accessible on the new server NS 410. Those skilled in the art will appreciate that the steps described in FIG. 4 may be performed in a different order for consolidating shares from a legacy server onto a new server. For instance, a legacy server root and a link on the legacy server root may be created on the consolidation server CS 406 before the contents and permissions of the legacy files are copied to the new server NS 410. After the legacy shares have been consolidated onto a new server, the legacy server may then be retired or renamed and used for other purposes.

Figure 5:
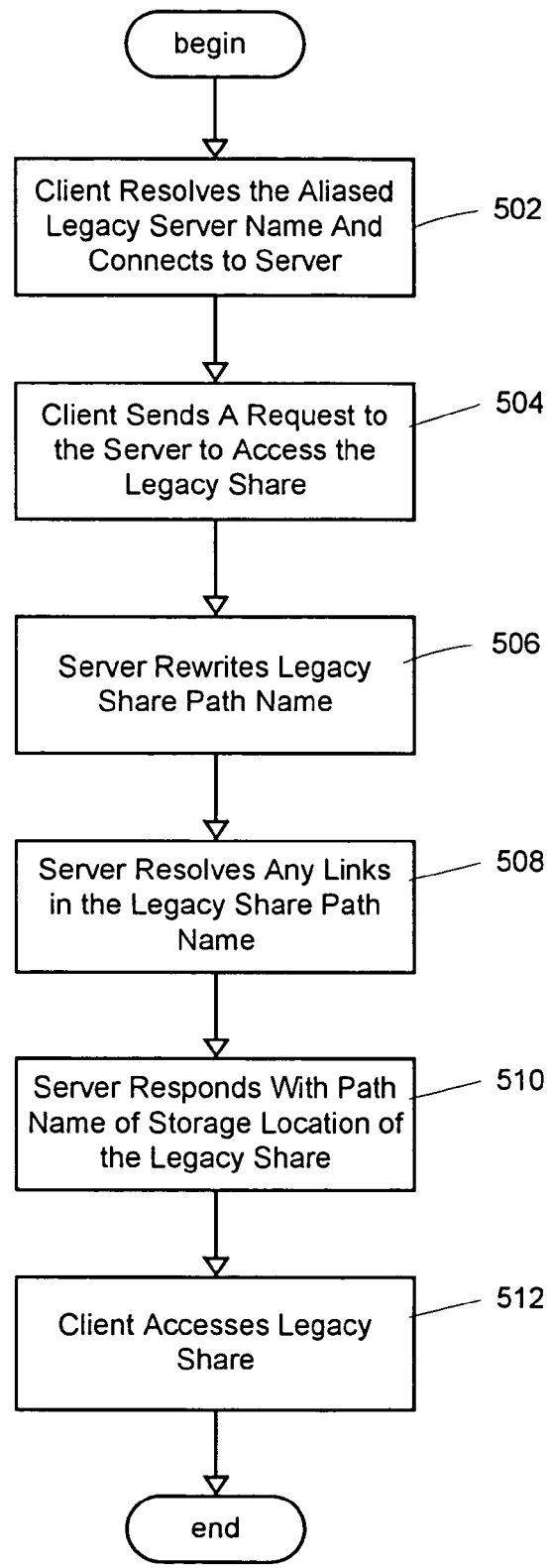
FIG. 5 is a flowchart generally representing the steps undertaken for accessing a reorganized share moved from a legacy server onto another server, in accordance with an aspect of the present invention.

FIG. 5 presents a flowchart generally representing the steps undertaken for accessing a reorganized share moved from a legacy server onto another server. A client may wish to access a reorganized legacy share using the legacy share name. At step 502, the client may resolve the aliased legacy server name and establish a connection to the network address of the reorganization server CS. The client may then send a request to the reorganization server to access the legacy share at step 504. In one embodiment, the request may be a Dfs request for establishing access to the legacy share.

At step 506, the reorganization server may rewrite the legacy share path by prepending the reorganization server name to the legacy share path so that the distributed file system may find that the rewritten path corresponds to a local root with the legacy server name and then may access that local root. After rewriting the legacy share path, the distributed file system on the reorganization server continues normal processing on the rewritten path. As part of its normal processing, the distributed file system 204 may traverse the rewritten legacy share path and encounter a link pointing to a storage location of a relocated legacy share. In this case, the distributed file system 204 may resolve any links encountered while traversing the rewritten legacy share path at step 508 by invoking the path redirector 208. Such a link may point to any kind of path that may be supported by the distributed file system protocols, including Dfs, SMB, NetBIOS, NFS, NFSP or other type of protocol.

Upon resolving the link, the distributed file system may respond at step 510 with the share path of the storage location of the relocated legacy share. The client may, in turn, access the legacy share at step 512. Information about the redirection to the legacy share may also be recorded in the database. In one embodiment of the reorganization server, the relocated storage may be organized in a separate Dfs namespace. In this case, the link may contain the path in the namespace that corresponds to the reorganized legacy share. Advantageously the path redirector 208 of the reorganization server may, in turn, redirect that path to the new namespace and later the storage may be moved or reorganized within the new Dfs namespace without impacting the redirection into the new Dfs namespace.

Figure 6:
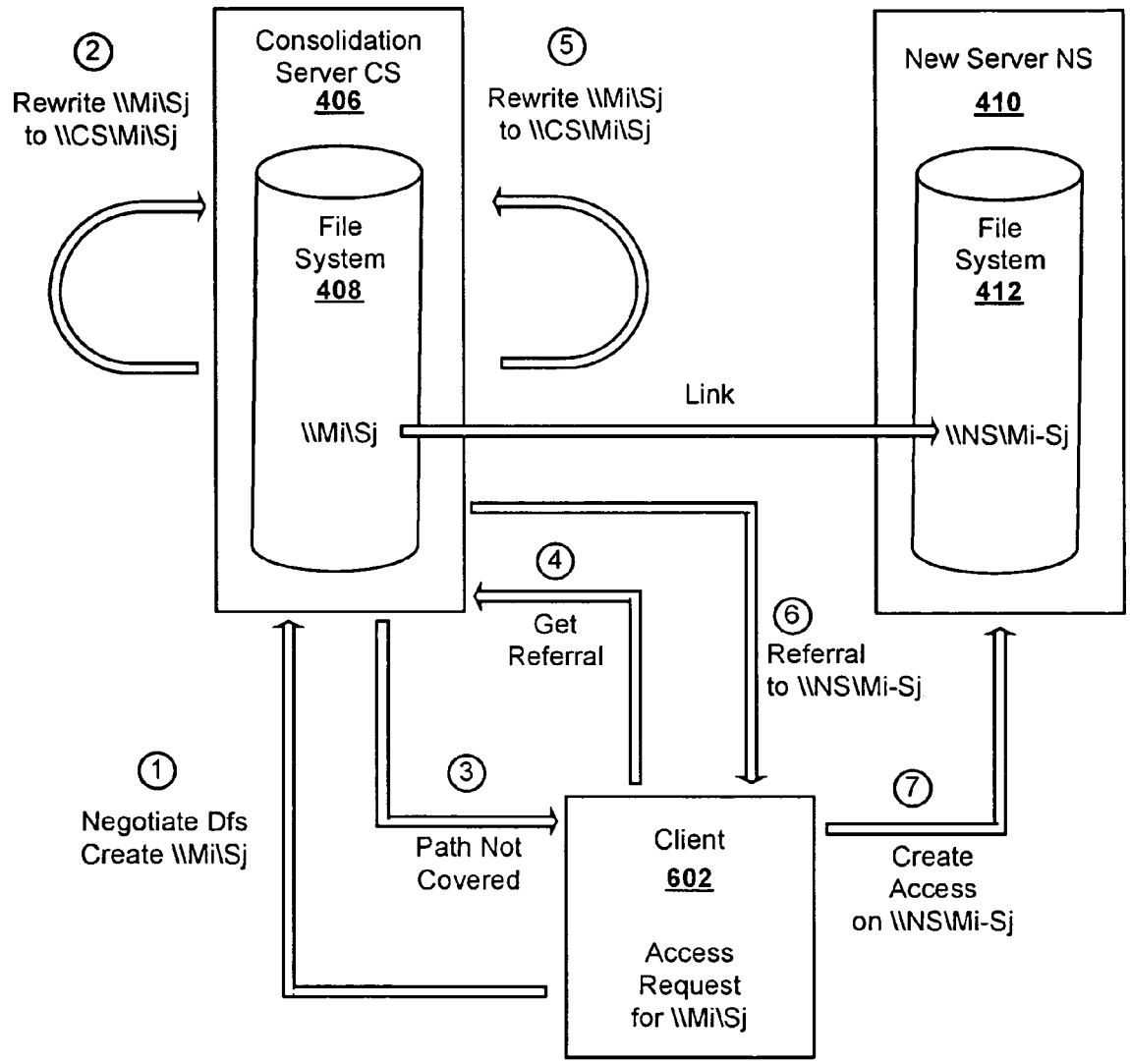
FIG. 6 is an exemplary illustration generally representing a client accessing a legacy share that has been consolidated on another server, in accordance with an aspect of the present invention.

Returning to the embodiment of the present invention where the reorganization server may be a consolidation server, FIG. 6 presents an exemplary illustration generally representing a client accessing a legacy share that has been consolidated on another server as previously described and shown in FIG. 4. In this embodiment, the client 602 may send an access request to the consolidation server CS 406 for the legacy share \\$M_i$\$S_j$. In the first step of FIG. 6, the client who wants access to a legacy path \\$M_i$\$S_j$ may resolve the server name $M_i$ that is aliased to the consolidation server CS 406 either through DNS or NetBIOS, or any other name resolution protocol. The client may then connect to the network address of the consolidation server CS 406 via the SMB protocol. The client and the server may negotiate that the legacy share is a Dfs share and the client may then send a create request to the consolidation server CS 406 for the legacy path \\$M_i$\\$S_j$.

In the second step, the consolidation server executing the distributed file system 204 with the path rewriter 206 enabled may receive the create request for the legacy path \\$M_i$\\$S_j$. When any type of request for a share is received with the path rewriter enabled, the distributed file system on the consolidation server may automatically rewrite any path for a legacy share by prepending the consolidation server name to the path. For example, upon receipt of a request for a share with the path name of \\$M_i$\\$S_j$, the distributed file system on the consolidation server may automatically rewrite this path to \\CS\\$M_i$\\$S_j$ before performing any processing on the path name. As a result, the consolidation server CS may respond, or handle locally, accesses to paths of the form \\CS\\$M_i$. After rewriting the path name, the distributed file system on the consolidation server may continue normal processing on the rewritten path name. The distributed file system 204 may find that this path corresponds to a local root and then may access the local root $M_i$. In one embodiment, if the consolidation server cannot find any root using the rewritten path \\CS\\$M_i$\\$S_j$, it may automatically revert back to the original path \\$M_i$\\$S_j$ sent by the client and may assume that this is a local root that was not consolidated.

In step three, the distributed file system may traverse the legacy share path name and encounter a link pointing to a storage location of a relocated legacy share, such as the link $S_j$ in the legacy path \\$M_i$\\$S_j$ of the file system 408. In one embodiment, an SMB server on the consolidation server may traverse the legacy share path and discover a reparse point that indicates $S_j$ is a link and may return a message, such as STATUS_PATH_NOT_COVERED, indicating to the client 602 that $S_j$ is a link. In step four, the client 602 may send a referral message for \\$M_i$\\$S_j$ to the consolidation server. Upon receiving the message, the consolidation server CS may then rewrite the referral request path \\$M_i$\\$S_j$ to \\CS\\$M_i$\\$S_j$ in step five and may determine using the path redirector 208 that the rewritten path \\CS\\$M_i$\\$S_j$ maps to a link to \\NS\\$M_i$-$S_j$. Note that there may be many links within a path and this process may be repeated, on the same or on different servers, for each link discovered in the path. In one embodiment, if the consolidation server cannot find any root using the rewritten path \\CS\\$M_i$\\$S_j$, it may automatically revert back to the original path \\$M_i$\\$S_j$ sent by the client and may assume that this is a local root that was not consolidated.

In step six, the consolidation server responds to the client with a referral to the share path \\NS\\$M_i$-$S_j$ which is the new location of the consolidated legacy share. The client may then access the path \\NS\\$M_i$-$S_j$ in step seven. In one embodiment, the client machine may automatically cache the referral to the location of the consolidated legacy share so that the client may directly access the location of the consolidated legacy share for any additional access, or for a specified period of time, without needing to go through the consolidation server or require redirection.

Figure 7:
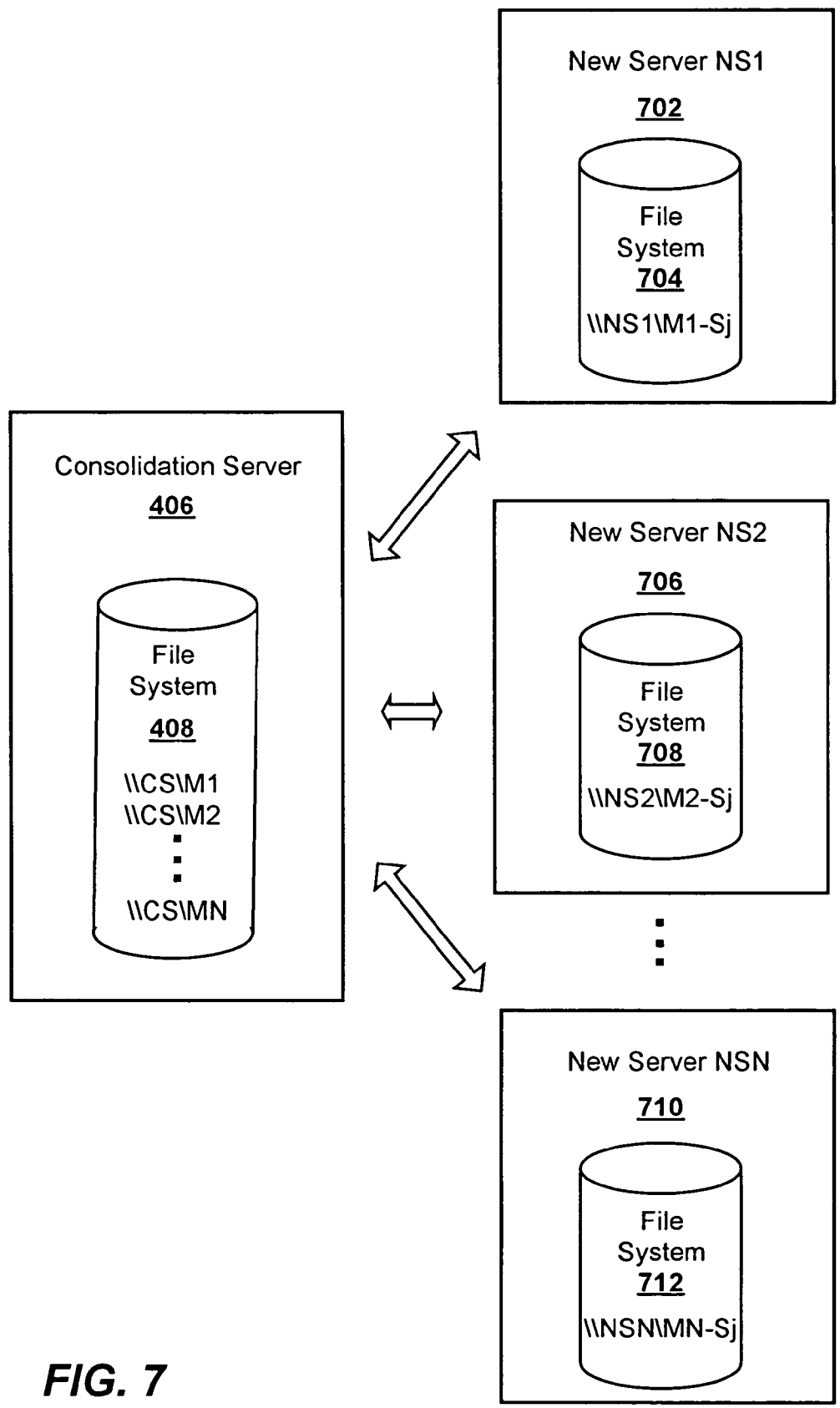
FIG. 7 is an exemplary illustration generally representing a consolidation server performing name redirection for consolidated legacy shares placed on several other servers, in accordance with an aspect of the present invention.

Although FIGS. 4 and 6 show one consolidation server, there may be one or more consolidation servers that may perform name redirection for the consolidated legacy shares. Moreover, in one embodiment, the legacy shares may be placed on one or more other servers as illustrated in FIG. 7. The file system 408 of consolidation server 406 in FIG. 7 may include a local root for legacy server names $M_1$ to $M_N$, each of which root has a link $S_j$ to the share name on a new server where the legacy shares for that legacy server are copied. For instance, the file system 408 of consolidation server 406 includes the local root for legacy server name $M_1$ with a link $S_j$ that points to the consolidated legacy shares \\$NS_1$\\$M_1$-$S_j$ on file system 704 of New Server 1 702. Similarly, the file system 408 of consolidation server 406 includes the local root for legacy server name $M_N$ with a link $S_j$ that points to the consolidated legacy shares \\$NS_N$\\$M_N$-$S_j$ on file system 712 of New Server N 710.

Figure 8:
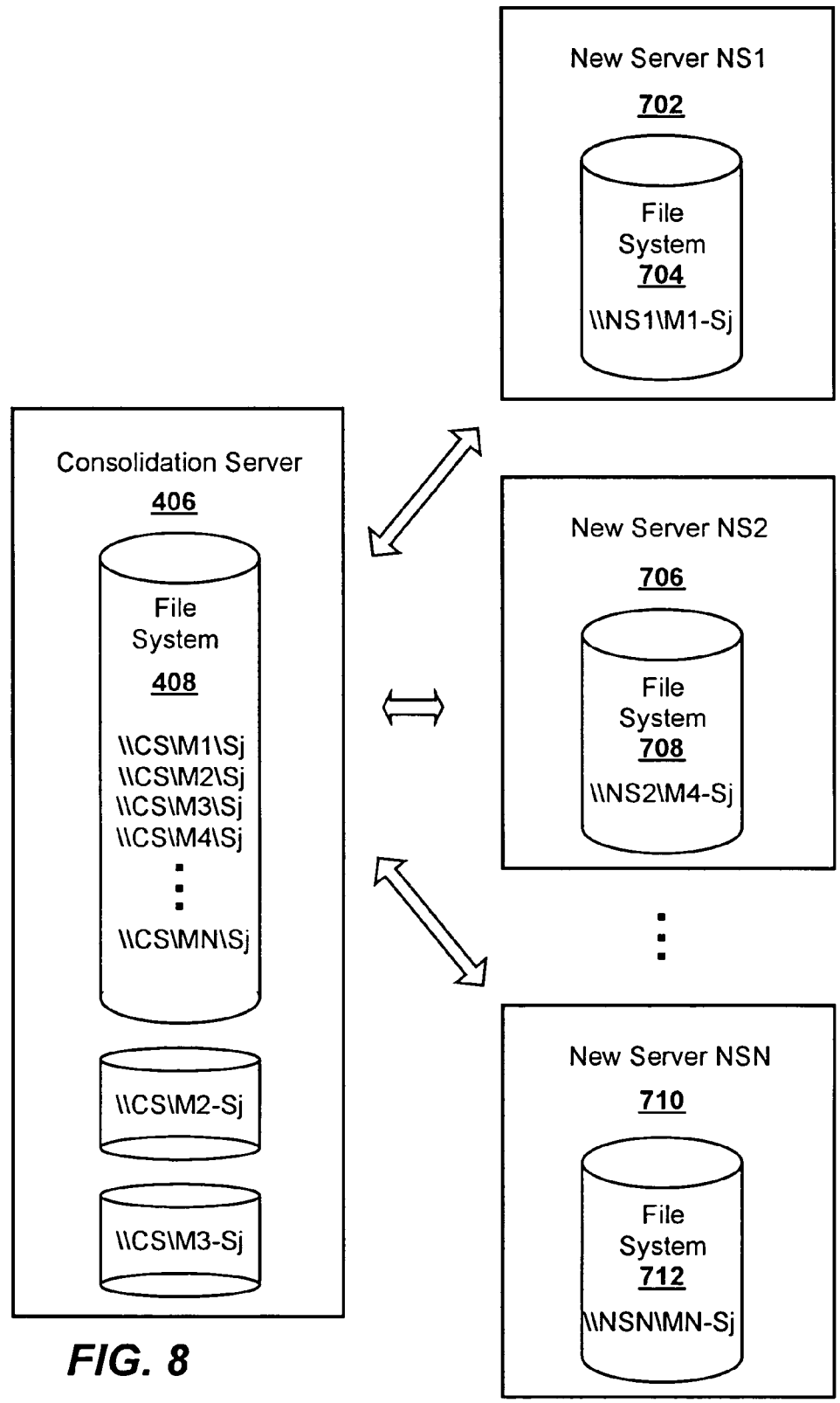
FIG. 8 is an exemplary illustration generally representing a consolidation server hosting a subset of consolidated legacy shares, in accordance with an aspect of the present invention.

In addition to performing name redirection for the consolidated legacy shares, the consolidation server may itself host a subset of the consolidated legacy shares in another embodiment as illustrated in FIG. 8. The file system 408 of consolidation server 406 in FIG. 8 may include a local root for legacy server names $M_1$ to $M_N$. With the exception of the local roots for legacy server names $M_2$ and $M_3$, each of the local roots has a link $S_j$ to the share name on a new server where the legacy shares for that legacy server are copied. For these consolidated legacy share, the consolidation server 406 may perform name redirection. For instance, the file system 408 of consolidation server 406 includes the local root for legacy server name $M_4$ with a link $S_j$ that points to the consolidated legacy shares \\$NS_2$\\$M_4$-$S_j$ on file system 708 of New Server 2 706. However, the file system 408 of consolidation server 406 may itself host the consolidated legacy shares \\$M_2$\\$S_j$ and \\$M_3$\\$S_j$, under the share names \\CS\\$M_2$-$S_j$ and \\CS\\$M_3$-$S_j$, respectively. The consolidation server 406 may as well perform name redirection for these consolidated legacy shares. Those skilled in the art will appreciate that in another embodiment, the consolidation server alone could host all of the consolidated shares.

Not only may the system and method transparently reorganize storage, the present invention may advantageously allow for monitoring access and usage of reorganized legacy shares at a single location rather than multiple locations in a distributed file system. Whenever the consolidation server sees a request for a legacy share, the distributed file system 204 may log information about the request into the database or log file. Any information about access to a legacy share may be recorded in the database, such as the name of the legacy share that was accessed, which client requested access to the share, etc. This information may be used by a storage administrator to track the active usage of the legacy shares and retire any shares infrequently used. Moreover, a storage administrator may use the information to map which user or applications are accessing the legacy paths so that the storage administrator may decide what applications need to be updated with the new path name, or alternatively, to decide which users to notify to update their links to the new path name.

As can be seen from the foregoing detailed description, the present invention provides an improved system and method for transparently reorganizing storage so that a client or user may access the reorganized storage using the legacy share name. Advantageously, legacy names embedded in documents, web pages, and applications do not need to be changed to the path name for the new storage location of a relocated legacy share, nor do users need to be trained to use the relocated legacy share path name. As is now understood, the system and method described for consolidating storage from one or more legacy servers is one example of many system configurations that may use the present invention for reorganizing storage. Other system configurations for reorganizing storage may include a distribution server that may use the present invention for replacing a monolithic server by dispersing legacy file shares from the monolithic server across one or more smaller servers. Thus the present invention may be used to expand storage from a few servers to many servers as well as to consolidate storage from many servers to fewer servers. Yet another system configuration may include a transfer server that may use the system and method for replacing a legacy server with a replacement server by transferring legacy file shares on the legacy server to the replacement server. Furthermore, the system and method provided are flexible and extensible so that any file system or data access system using a file system or name resolution protocol with path rewriting and path redirection implemented may be used. Moreover, the redirection provided by the present invention may occur across share path names, server names and file system or data access protocols. Thus, this approach may be used to consolidate storage, for example, on a Microsoft Windows™ Sharepoint server. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method in a client-server computer network for reorganizing storage and accessing the reorganized storage such that clients in the network may access stored data, after the data has been moved to a new location, by using the original path name of the original location of the data, the method comprising:

relocating a legacy share from a legacy server to a new server;

copying contents of the legacy share to the new server, the contents comprising all data of the legacy share stored upon the legacy server;

copying permissions of the legacy share to the new server;

creating an alias for the legacy server name such that the unchanged legacy server name resolves to a network address of a consolidation server;

creating a legacy server root associated with the legacy server name on the consolidation server;

creating a link on the legacy server root corresponding to the legacy share on the new server;

resolving the legacy server name that is aliased to the consolidation server;

receiving at the consolidation server a request from a client for the legacy share, the request specifying the original, unchanged legacy share path name;

logging information about the request, the information comprising a name of the legacy share and a name of a client making the request;

tracking active usage of the legacy share through the logged information;

based upon the logged information and the tracked active usage, determining when the legacy share should be retired based upon infrequent usage;

the consolidation server rewriting the legacy share path name, wherein rewriting the legacy share path comprises of invoking a path rewriter to rewrite the legacy share path, by prepending the legacy share path with the consolidation server name;

the consolidation server traversing the rewritten legacy share path name and resolving links within the rewritten legacy share path name, wherein resolving any links in the rewritten legacy share path comprises invoking a path redirector to resolve any links in the rewritten legacy share path; and the consolidation server responding to the client request with the share path name of the storage location of the relocated legacy share.

2. The method of claim 1 further comprising resolving the aliased legacy server name to establish a connection to the network address of a server.

3. The method of claim 1 further comprising sending an access request to the new server for the legacy share path name.

4. The method of claim 1 wherein the consolidation server and the new server are the same server.

5. The method of claim 1 further comprising encountering a link while traversing the rewritten legacy share path.

6. The method of claim 1 further comprising accessing the share path of the storage location of the relocated legacy share.

7. The method of claim 6 wherein accessing the share path of the storage location of the relocated legacy share comprises sending a Dfs create request to the network address of the storage location of the relocated legacy share.

8. The method of claim 6 wherein accessing the share path of the storage location of the relocated legacy share comprises accessing a path of a separate Dfs namespace.

9. The method of claim 1 further comprising encountering a Dfs reparse point while traversing the rewritten legacy share path.

10. The method of claim 9 further comprising returning a message to the client indicating the path contains a link.

11. The method of claim 10 further comprising receiving a referral request message from the client for the referral path.

12. A computer readable storage medium having encoded thereon computer-executable instructions for executing a method for reorganizing storage and accessing the reorganized storage such that clients in a network may access stored data, after the data has been moved to a new location, by using the original path name of the original location of the data, the method comprising:

relocating a legacy share from a legacy server to a new server;

copying contents of the legacy share to the new server, the contents comprising all data of the legacy share stored upon the legacy server;

copying permissions of the legacy share to the new server;

creating an alias for the legacy server name such that the unchanged legacy server name resolves to a network address of a consolidation server;

creating a legacy server root associated with the legacy server name on the consolidation server;

creating a link on the legacy server root corresponding to the legacy share on the new server;

resolving the legacy server name that is aliased to the consolidation server;

receiving at the consolidation server a request from a client for the legacy share, the request specifying the original, unchanged legacy share path name;

logging information about the request, the information comprising a name of the legacy share and a name of a client making the request;

tracking active usage of the legacy share through the logged information;

based upon the logged information and the tracked active usage, determining when the legacy share should be retired based upon infrequent usage;

the consolidation server rewriting the legacy share path name, wherein rewriting the legacy share path comprises of invoking a path rewriter to rewrite the legacy share path, by prepending the legacy share path with the consolidation server name;

the consolidation server traversing the rewritten legacy share path name and resolving links within the rewritten legacy share path name, wherein resolving any links in the rewritten legacy share path comprises invoking a path redirector to resolve any links in the rewritten legacy share path; and the consolidation server responding to the client request with the share path name of the storage location of the relocated legacy share.

* * * * *